United States Patent Office 3,350,364
Patented Oct. 31, 1967

3,350,364
POLYMERIZATION OF LACTAMS USING AN N-ACYL UNSATURATED HETEROCYCLIC COMPOUND AS A PROMOTER
Herbert K. Reimschuessel and Franklin Boardman, Morristown, N.J., assignors to Allied Chemical Corporation, New York, N.Y., a corporation of New York
No Drawing. Filed Mar. 24, 1964, Ser. No. 354,461
8 Claims. (Cl. 260—78)

ABSTRACT OF THE DISCLOSURE

A process for anionic polymerization of lactam having at least 7 ring atoms wherein the promoter is an N-acyl unsaturated heterocyclic compound such as particularly acetimidazolide, 1-aceto - 3,5 - dimethylpyrazolide, N,N' carbonyldiimidazole, and 9-acetocarbazolide.

---

This invention relates to the preparation of polyamides and more particularly to the use of novel promoters or co-catalysts in the anionic polymerization of lactams to form solid, linear polyamides of high molecular weight.

Many processes have been proposed in the past for preparation of solid polyamides of lactams such as E-caprolactam. These processes have been based either upon the hydrolytic polymerization of the lactam in the presence of various acidic and basic catalysts, or upon the anionic polymerization of these lactams, i.e. polymerization under anhydrous conditions in the presence of an alkali or alkaline earth metal compound which can be regarded as forming a metal salt with the lactam.

A disadvantage of these prior art processes is the necessity of conducting the process at relatively high temperatures; e.g. for E-caprolactam, temperatures in excess of the polymer melting point of about 215–225° C. are necessary in order to obtain satisfactory rate and degree of polymerization. An undesirable feature in the use of such high temperatures is that the extent of polymerization decreases as the temperature of the reaction mixture is increased. For instance, if E-caprolactam is polymerized at temperatures in excess of 215° C. appreciable quantities of E-caprolactam are not converted to polymer, whereas below 200° C. the formation of poly-E-caprolactam is more highly favored. When high polymerization temperatures are used it is frequently necessary to resort to extensive purification procedures to remove undesirable monomeric units present in the polymer.

A further disadvantage of the prior art processes is that the polyamides produced thereby have at best only moderate molecular weights, corresponding to reduced viscosity of about 3.5 dl./gm. in 0.5% solution in m-cresol at 25° C., or roughly 100,000 weight average molecular weight.

In addition in those instances where it was desirable to transform poly-E-caprolactam into molded shapes, it was usual to heat said lactam to a temperature in excess of its melting point to prepare the desired fabricated shapes by extrusion or injection techniques. However, the poly-E-caprolactam melt is extremely viscous, transfers heat slowly, and shrinks on cooling to leave voids. Consequently, such melt is not usable without special techniques for the preparation of large shaped articles. Moreover, the above-cited polyamides possess a tendency to discolor in air at elevated temperatures, about 270° C., commonly employed in said molding operations.

It has recently been disclosed that the use of various promoters or co-catalysts permits anionic polymerization of lactams at temperatures below the polymer melting points. Some suitable catalysts and particular promoters are set forth for example in U.S. Patent No. 3,017,391 of January 16, 1962, and No. 3,018,273 of January 23, 1962, both to Butler, Hedrick and Mottus.

In accordance with the present invention, it has been discovered that a novel class of promoters of anionic catalysts can be used to effect anionic polymerization of lactams below the melting point of the resulting polymers and to obtain in short reaction times polymers having high molecular weights at polymerization temperatures which can be but need not necessarily be below the polymer melting point. The promoters used in the process of the present invention are N-acyl unsaturated heterocyclic compounds having a double bond (which can be of aromatic character or not) in the 2,3-position of the heterocyclic ring wherein an acylated nitrogen atom is in the 1-position. Representative classes of these promoters are cited below. A particularly preferred subgroup of these promoters, preferred as being highly active for our purposes and readily available, are the azolides.

These azolides are derivatives of azole compounds and organic acids such as carboxylic or organic sulfonic acids, wherein the acyl group of the acid is bound to a nitrogen atom in the azole ring. The term "azole ring" is used herein generically to refer to any five-membered unsaturated ring including at least one nitrogen atom bearing a substituent, wherein a double bond is in 2,3-position with reference to this nitrogen atom. Compounds containing such rings are herein referred to generically as "azole compounds"; and such compounds having an acyl group as the substituent on the aforesaid nitrogen atom are herein generically called "azolides" by analogy to "amides" of the acids.

Illustrative of classes of compounds which are utilized as promoters in the present invention are the following classes of compounds in which XR represents an acyl radical and R represents any substituent which is non-reactive with strongly basic anionic polymerization catalysts, e.g. hydrogen; an aliphatic group such as a $C_1-C_8$ alkyl group; a perfluorinated alkyl group; an alkoxy group; an aromatic group such as a phenyl radical; a heterocyclic group such as a radical of an azole compound; a radical containing two or more of these groups such as a lower alkyl substituted phenyl radical, or a radical such as

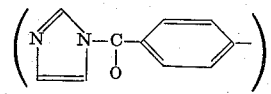

as in terephthalodiimidazolide; etc. Thus illustrative classes of our promoter compounds are:

pyrrolides i.e. N-acylpyrroles represented by the general formula

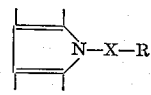

N-acylindoles of the general formula

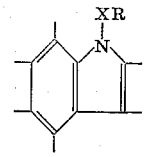

imidazolides of the general formula

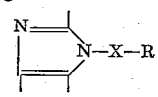

pyrazolides of the general formula

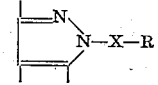

triazolide isomers of the general formulas

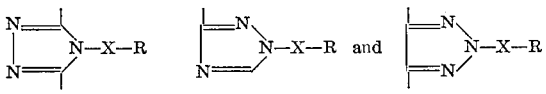

tetrazolide isomers of the general formulas

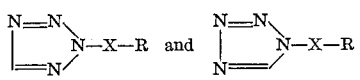

benzimidazolides of the general formula

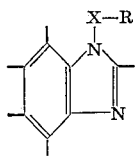

benzotriazolides of the general formula

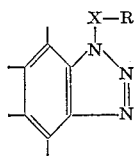

carbazolides of the general formula

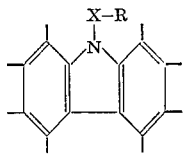

also 10-acylacridans such as 10-acetylacridan; 9,10-diacyl-9,10-dihydrophenazines such as 9,10-dicarbethoxy-9,10-dihydrophenazine; 10-acylphenothiazines such as 10-acetylphenothiazine; 1-acetyldihydropyridazines such as 1-acetyl-1,4-dihydro-3,6-dimethylpyridazine; etc. These latter classes of compounds are representative of compounds containing 6-membered rings of the characteristics found necessary for the promoters of this invention.

As indicated by the free valences, the essential moiety in the azole and other compounds used as promoters in this invention is the nucleus; and the various nuclei in the promoter compounds used in the present invention can bear any desired inert substituents independently selected, such as those above indicated for R.

Of particular interest are the promoters which are diazolides such as N,N'-carbonyldiimidazole of formula:

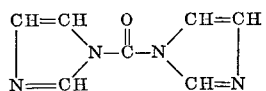

terephthalodiimidazolide; etc. Since the diazolides are difunctional it is believed that they promote polymer chain growth at both ends from the promoter as a center, thus resulting in identical end groups at the two ends of the polymer chain. Use of N,N'-carbonyldiimidazole as a promoter has resulted in poly-e-caproamide having considerably higher reduced viscosity than the poly-e-caproamides obtained with the other azolide promoters.

The promoters used for purposes of the present invention can be prepared in general by reaction of the parent azole or other ring compound, or sodium or silver salt thereof, with the chloride of the parent acid in dry benzene or dry tetrahydrofuran, as already known.

The promoter of the present invention must interact with an anionic catalyst and lactam to initiate the polymerization process. The ratio of equivalents of metal in the anionic catalyst to moles of azolide can vary widely. In general the polymer molecular weight will tend to be higher and the polymerization rate will be lower at the lower metal to promoter ratios, and at lower promoter concentrations. Suitable ratios of equivalents of metal in the catalyst to moles of azolide promoter are in the range from about 0.01:1 to about 20:1. Suitable promoter concentrations are in the range of 0.1 mole to 10 moles per 100 moles of the lactam being polymerized. The interacting of an acyl monoazolide promoter, the lactam, and the catalyst results in lactam polymer having the acyl group as an end group in the polymer. Accordingly use of perfluoroacyl azolides results in polymers believed to be novel, having a perfluoroacyl end group.

The lactams employed as at least the major polymerizable ingredient in accordance with this invention are E-caprolactam and lactams with larger rings, e.g. 8–13 membered rings, especially omega-enantholactam and omega-caprylolactam; and homologs thereof. Anionic polymerization of the lactams with six-membered and smaller rings differs in character, as is known, from anionic polymerization of lactams having 7-membered and larger rings. However, lactams with 6 and fewer atoms in the lactam ring can be used in minor proportions in forming copolymers with the above lactams, suitable examples being azetidine-2-ones such as 4,4-dimethylazetidine-2-one; 2-pyrrolidone; and 2-piperidone. Moreover, together with E-caprolactam or larger ring lactam a dilactam can be used, to form a cross-linked polymer; and mixtures of lactams having seven-membered or larger lactam rings can be used to form polymers including cross-linked polymers in accordance with this invention.

Polymerization temperatures which can be employed in the present invention range from the melting point of the lactam monomer to the decomposition temperature of the resulting polymer. To minimize content of low molecular weight materials, e.g. monomers and to realize good rates, the polymerization of caprolactam is carried out in a temperature range of about 130°–215° C. Particularly good results in terms of rate and yield are obtained by polymerizing caprolactam and lactams with larger rings, e.g. 8–13 membered rings, within the range of 160°–180° C.

It is necessary that the polymerization process disclosed herein be conducted under substantially anhydrous, non-acidic conditions. Those compounds which are capable of functioning as proton donors, viz. acids stronger than the lactam acting as an acid, are to be excluded from the reaction mixture (or neutralized) inasmuch as acidic compounds decompose equivalent proportions of the metal salts of lactams in the reaction mixture by replacing the metallic cation moiety of said species with a proton. Furthermore under the process conditions disclosed herein the presence of a proton donating species such as water may function to hydrolize the lactam to carboxylic acids. The quantity of water and/or proton donating species should be kept preferably not above about 50 p.p.m.

The polymerization process is preferably conducted by adding an azolide to a reaction mixture containing a metal salt of the lactam, and the lactam; but a reverse procedure can be utilized if desired, i.e. the azolide can be added to the lactam, and the alkali or alkaline earth metal or salt-forming compound thereof can be added thereafter. Alternatively, if desired, it is possible to add the azolide simultaneously with the alkali or alkaline earth metal anionic catalyst to the lactam.

The metal salt of the lactam is preferably prepared in situ immediately prior to its utilization in the polymerization process, to minimize risk of contamination. However, if desired a mixture of the lactam and the metal salt of the lactam may be prepared in advance and stored for periods of a month or longer if the temperature is controlled so as to prevent polymerization.

By utilization of an azolide in conjunction with an alkali or alkaline earth metal catalyst in accordance with our invention, high rate of lactam polymerization results, as well as a high degree of conversion to polymer at temperature considerably below the melting point of the polymer produced. For instance, in preparing polycaproamide which melts at 215°–220° C., it has been found that excellent results are obtained with polymerization temperatures of 160°–180° C. By the present invention it is possible to obtain polymeric products in which at least 95% of the monomer has been converted to polymer. Such degree of monomer conversion is highly desirable in that removal of residual monomer from the polymer obtained is unnecessary.

Polyamides can be prepared by the process of the present invention having molecular weights encompassing and appreciably exceeding those usually obtained by the conventional polymerization processes which do not employ anionic catalysts. High molecular weight materials produced by the present invention possess greater tensile strength and toughness, especially at elevated temperatures, than polyamides of much lower molecular weight.

The polymerization of relatively fluid monomer to solid polymer in the present process allows polymerizing lactams directly in molds, including molds of intricate design, to form solid shaped articles. The resulting articles are free of voids when any bubbles initially present are allowed to escape. Centrifugal and rotational casting methods, similar to those used for vinyl plastisols, can be used very conveniently.

A further advantage is that various additives including fillers such as sand; pigments such as carbon black; blowing agents such as oxazides; plasticizers; stabilizers; and reinforcing agents such as fibers of glass, metal and organic material can be readily added to the monomer to be converted to polymer by the present process. Such operations provide uniform distribution of the additive throughout the resulting polymer.

The following specific examples are given to further illustrate the invention and the best mode contemplated by us of carrying it out; but the invention is not to be understood as limited to all details described therein. "Parts" in the examples are parts by weight; and reduced viscosities are measured at concentrations of about 0.5 gm. of polymer per 100 ml. of solution, the units accordingly being deciliters per gram. The method of determining polymer yield was by extracting hot water solubles from the polymer and drying, as described in Example 1.

The procedures used and results obtained in all examples were essentially identical except as otherwise specified.

*Example 1*

1 part of sodium and 1000 parts of ε-caprolactam were heated together in a dry nitrogen atmosphere at 100° C. until all of the sodium dissolved. 4.8 parts of acetimidazolide were admixed with the molten lactam; the temperature was quickly brought to 170° C.; and the temperature was kept at 170° C. while maintaining the inert atmosphere over the mixture. After 20 minutes of heating, the mixture solidified reproducing the form of the interior of the reaction vessel.

Heating at 170° C. under inert atmosphere was continued for a total of 4 hours. The resulting polymer was extracted with water at 98° C. for 16 hours and dried for 12 hours in a vacuum oven at 56° C. The yield of thus extracted and dried polymer was 95.5%. Its reduced viscosity in m-cresol at 25° C. was 4.2 dl./gm.

*Example 2*

3.3 parts of a butyllithium solution (1.5 molar in hexane) and 207 parts of caprolactam were heated in a dry nitrogen atmosphere at 170° C. until all of the hexane had boiled off. 1 part of acetimidazolide was admixed with the molten lactam, and the reaction temperature was kept at 165° C. for 3 hours. After 15 minutes of heating the mixture solidified. The final yield of polymer was 95.9%. Its reduced viscosity in m-cresol was 2.5 dl./gm.

*Example 3*

88 parts of caprolactam and 3 parts of butyllithium solution (1.5 molar in hexane) were heated together at 170° C. until all of the hexane had boiled off. 1 part of terephthalodiimidazolide was admixed with the molten lactam and the reaction temperature kept at 180° C. for 3 hours. After 23 minutes the mixture solidified. The final yield of polymer was 97%; its reduced viscosity in m-cresol at 25° C. was 3.1 dl./gm.

*Example 4*

50 parts of caprolactam and 2 parts of butyllithium solution (1.5 molar in hexane) were heated together at 160° C. until all of the hexane boiled off. 1 part of p-toluenesulfonimidazolide was admixed with the molten lactam, and the reaction temperature was kept at 170° C. for 3 hours. After 18 minutes the mixture solidified. Final yield of polymer was 95.5%. Its reduced viscosity in m-cresol at 25° C. was 2.9 dl./gm.

*Example 5*

100 parts of caprolactam and 1 part of sodium were heated together at 100° C. until all of the sodium dissolved. 1 part of 1-aceto-3,5-dimethylpyrazolide was admixed therewith and the temperature was quickly brought to 170° C. and maintained at 170° C. After 13 minutes the mixture solidified; at this time the yield of polymer was 90% and its reduced viscosity in m-cresol at 25° C. was 1.3 dl./gm. Heating at reaction temperature of 170° C. was continued for a total of 3 hours whereby a polymer yield of at least 95% is obtained.

*Example 6*

575 parts of caprolactam were heated with 1 part of potassium at 100° C. until all of the potassium dissolved. 3.8 parts of 1-aceto-3,5-dimethylpyrazolide were admixed therewith and the temperature was quickly brought to 170° C. and there maintained. After 10 minutes the mixture solidified; at this time the yield of polymer was 93%; and its reduced viscosity in m-cresol at 25° C. was 2.1 dl./gm. Heating at reaction temperature of 170° C. was continued for a total of 3 hours, whereby a polymer yield of at least 95% is obtained.

*Example 7*

500 parts of caprolactam and 1 part of sodium were heated at 100° C. until all of the sodium dissolved. 7.1 parts of acetobenzotriazolide were admixed therewith and the reaction temperature was brought to and kept at 165° C. After 2 hours the mixture solidified. The heating was continued for a total of 5 hours. The yield of polymer resulting was 95% and its reduced viscosity in m-cresol at 25° C. was 2.5 dl./gm.

*Example 8*

500 parts of caprolactam and 1 part of sodium were heated together at 100° C. until all of the sodium dissolved. 4.9 parts of 1-aceto-1,2,4-triazolide were admixed therewith and the temperature was quickly brought to 180° C. and kept at 180° C. for 4½ hours. After 90 minutes the polymer solidified. The final yield of polymer was 96% and its reduced viscosity in m-cresol at 25° C. was 2.7 dl./gm.

*Example 9*

500 parts of caprolactam and 1 part of sodium were heated together at 100° C. until all of the sodium dissolved. 7.1 parts of acetobenzimidazolide were admixed therewith and the temperature was quickly brought to 170° C. and kept at 170° C. for 4 hours. The mixture solidified after 35 minutes. The final yield of polymer was 97.4% and its reduced viscosity in m-cresol at 25° C. was 3.6 dl./gm.

*Example 10*

1000 parts of caprolactam and 1 part of sodium were heated at 100° C. until all of the sodium dissolved. 5.7 parts of N,N'-carbonyldiimidazole were admixed therewith and the temperature was quickly brought to 160° C. and kept at 160° C. for 4½ hours. After 20 minutes the mixture solidified. The final yield of polymer was 95.7% and its reduced viscosity in m-cresol at 25° C. was 12.0 dl./gm.

*Example 11*

500 parts of caprolactam and 1 part of sodium were heated together at 100° C. until all of the sodium dissolved. 3.6 parts of freshly distilled trifluoroacetimidazole were admixed therewith and the temperature was quickly brought to 175° C. and kept at 175° C. for 3½ hours. After 45 minutes the mixture solidified.

The final yield of polymer was 97% and its reduced viscosity in m-cresol at 25° C. was 6.9 dl./gm. This polymer was a poly-e-caprolactam having a trifluoroacetyl end group which conferred improved resistance to moisture absorption as compared to conventional poly-e-caprolactam.

*Example 12*

1000 parts of caprolactam and 1 part of sodium were heated together at 100° C. until all of the sodium dissolved. 18½ parts of 1-aceto-3,5-dimethylpyrazolide were admixed therewith and the temperature was quickly brought to 175° C. and there maintained. After 15 minutes the mixture solidified; the yield of polymer at this time was 89% and its reduced viscosity in m-cresol at 25° C. was 3.4 dl./gm. Heating at 175° C. was continued for a total of 3 hours.

*Example 13*

218 parts of omega-enantholactam and 3.1 parts of a butyllithium solution (1.50 molar in hexane) were heated together at 170° C. until all of the hexane had boiled off. 1 part of aceto-3,5-dimethylpyrazolide was admixed with the molten lactam and the reaction temperature was kept at 170° C. for 3¼ hours. After 15 minutes the mixture solidified. The final yield of polymer was 97.8% and its reduced viscosity in m-cresol at 25° C. was 1.4 dl./gm.

Omega-caprylolactam, substituted for the enantholactam of this example, can be polymerized using otherwise the procedure of this example, to obtain generally similar results.

*Example 14*

214 parts of caprolactam and 1.9 parts of butyllithium solution (1.50 molar in hexane) were heated together at 175° C. until all of the hexane boiled off. 1 part of 9-acetocarbazolide was admixed therewith and the reaction temperature was kept at 175° C. for 3½ hours. After 29 minutes the mixture solidified. The final yield of polymer was 97.1% and the reduced viscosity in m-cresol at 25° C. was 4.6.

The procedure of each of the above examples can be modified by incorporating with the monomeric lactam a reinforcing agent, e.g. a fibrous reinforcing material such as 10%–90% of continuous glass filaments or rods, glass fabric, glass fibers say ¼"–1" long, etc. Polymerization can then be carried out as in each example to form a reinforced polymer product.

It will be apparent that many modifications and variations may be effected without departing from the scope or the novel concepts of the present invention, and that the illustrative details disclosed are not to be construed as imparting unnecessary limitations on the invention.

We claim:

1. In a process for polymerizing a lactam having at least 7 atoms in the lactam ring under anhydrous, non-acidic anionic polymerization conditions, the improvement of adding to the reaction mixture as a polymerization promoter an N-acyl unsaturated heterocyclic compound having a double bond in the 2,3-position of the heterocyclic ring wherein an acylated nitrogen atom is in the 1-position, selected from the group consisting of acetimidazolide, para-toluenesulfonimidazolide, 1-aceto-3,5-dimethyl-pyrazolide, acetobenzotriazolide, 1-aceto-1,2,4 - triazolide, acetobenzimidazolide, N,N' carbonyl-diimidazole, trifluoroacetimidazolide, and 9-acetocarbazolide.

2. A process as claimed in claim 1, wherein the lactam polymerized comprises at least one member of the group consisting of E-caprolactam, omega-enantholactam, and omega-caprylolactam.

3. A process as claimed in claim 2 wherein the lactam polymerized is E-caprolactam.

4. A process as claimed in claim 2 wherein said azolide is 1-aceto-3,5-dimethylpyrazolide.

5. A process as claimed in claim 2 wherein said azolide is acetimidazolide.

6. A process as claimed in claim 2 wherein said azolide is trifluoroacetimidazolide.

7. A process as claimed in claim 2 wherein said azolide is N,N'-carbonyldiimidazole.

8. A process as claimed in claim 2 wherein said azolide is para-toluenesulfonimidazolide.

References Cited

UNITED STATES PATENTS 3,017,391  1/1962  Mottus et al. _____ 260—78
3,206,418  9/1965  Giberson _____ 260—78

WILLIAM H. SHORT, *Primary Examiner.*

H. D. ANDERSON, *Assistant Examiner.*